(12) United States Patent
Nyamwange

(10) Patent No.: US 12,160,513 B2
(45) Date of Patent: Dec. 3, 2024

(54) SYSTEM FOR SECURE USER IDENTIFICATION USING DIGITAL IMAGE PROCESSING

(71) Applicant: BANK OF AMERICA CORPORATION, Charlotte, NC (US)

(72) Inventor: Elvis Nyamwange, Little Elm, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 217 days.

(21) Appl. No.: 17/887,231

(22) Filed: Aug. 12, 2022

(65) Prior Publication Data

US 2024/0056300 A1   Feb. 15, 2024

(51) Int. Cl.
| | | |
|---|---|---|
| H04L 9/32 | (2006.01) | |
| G06V 10/74 | (2022.01) | |
| G06V 10/75 | (2022.01) | |
| G06V 10/77 | (2022.01) | |
| G06V 10/94 | (2022.01) | |
| G06V 20/00 | (2022.01) | |

(52) U.S. Cl.
CPC .............. *H04L 9/32* (2013.01); *G06V 10/751* (2022.01); *G06V 10/761* (2022.01); *G06V 10/7715* (2022.01); *G06V 10/945* (2022.01); *G06V 20/95* (2022.01); *G06V 2201/10* (2022.01)

(58) Field of Classification Search
CPC .... H04L 9/32; G06V 10/7715; G06V 10/761; G06V 10/751; G06V 20/95; G06V 10/945; G06V 2201/10
See application file for complete search history.

(56) References Cited

U.S. PATENT DOCUMENTS

| | | |
|---|---|---|
| 10,068,078 B2 | 9/2018 | Dass |
| 10,331,936 B2 | 6/2019 | Bauchspies |
| 10,339,361 B2 | 7/2019 | Rakshit |
| 10,558,886 B2 | 2/2020 | Glover |
| 10,579,908 B2 | 3/2020 | Chen |
| 10,614,204 B2 | 4/2020 | Tussy |
| 10,698,995 B2 | 6/2020 | Tussy |
| 10,958,642 B2 | 3/2021 | Chow |
| 11,109,234 B2 | 8/2021 | Mars |
| 11,256,792 B2 | 2/2022 | Tussy |
| 11,273,841 B2 | 3/2022 | Goldman |
| 11,348,364 B2 | 5/2022 | Raff |
| 11,373,438 B2 | 6/2022 | Engelsma |
| 11,411,735 B2 | 8/2022 | Mars |
| 11,438,767 B2 | 9/2022 | Mars |
| 11,462,050 B2 | 10/2022 | Potash |

(Continued)

*Primary Examiner* — Raqiul A Choudhury
(74) *Attorney, Agent, or Firm* — Moore & Van Allen PLLC; Anup Shrinivasan Iyer

(57) ABSTRACT

Systems, computer program products, and methods are described herein for secure user identification using digital image processing. The present invention is configured to receive, via a first user input device, an input selection of a first image from a first user, wherein the first image is associated with a second user; extract features of the first image; determine a secure image matching the first image based on at least the features of the first image; extract, from the secure image, a unique device identifier associated with the second user embedded thereon; and transmit control signals configured to cause the first user input device to display the unique device identifier.

20 Claims, 7 Drawing Sheets

(56) References Cited

U.S. PATENT DOCUMENTS

| | | |
|---|---|---|
| 11,462,095 B2 | 10/2022 | Mars |
| 11,509,475 B2 | 11/2022 | Mars |
| 11,546,728 B2 | 1/2023 | Mars |
| 2018/0247151 A1* | 8/2018 | Talyansky ............ G06F 16/5838 |
| 2019/0098004 A1 | 3/2019 | Mars |
| 2022/0343328 A1* | 10/2022 | Fowler ............... G06Q 30/0631 |
| 2023/0040513 A1* | 2/2023 | Ryan ...................... G06V 20/52 |
| 2023/0043095 A1* | 2/2023 | Milam ...................... H04L 9/30 |
| 2023/0085677 A1* | 3/2023 | Copeland ................ G06F 21/64 |
| | | 705/66 |
| 2023/0118312 A1* | 4/2023 | Sun ...................... G06Q 20/389 |
| | | 705/69 |
| 2023/0145439 A1* | 5/2023 | Suk ..................... H04L 63/0861 |
| | | 705/44 |
| 2023/0298001 A1* | 9/2023 | Jethmalani ................ H04L 9/50 |
| | | 705/65 |
| 2023/0401195 A1* | 12/2023 | Miriyala ................... H04L 9/50 |

* cited by examiner

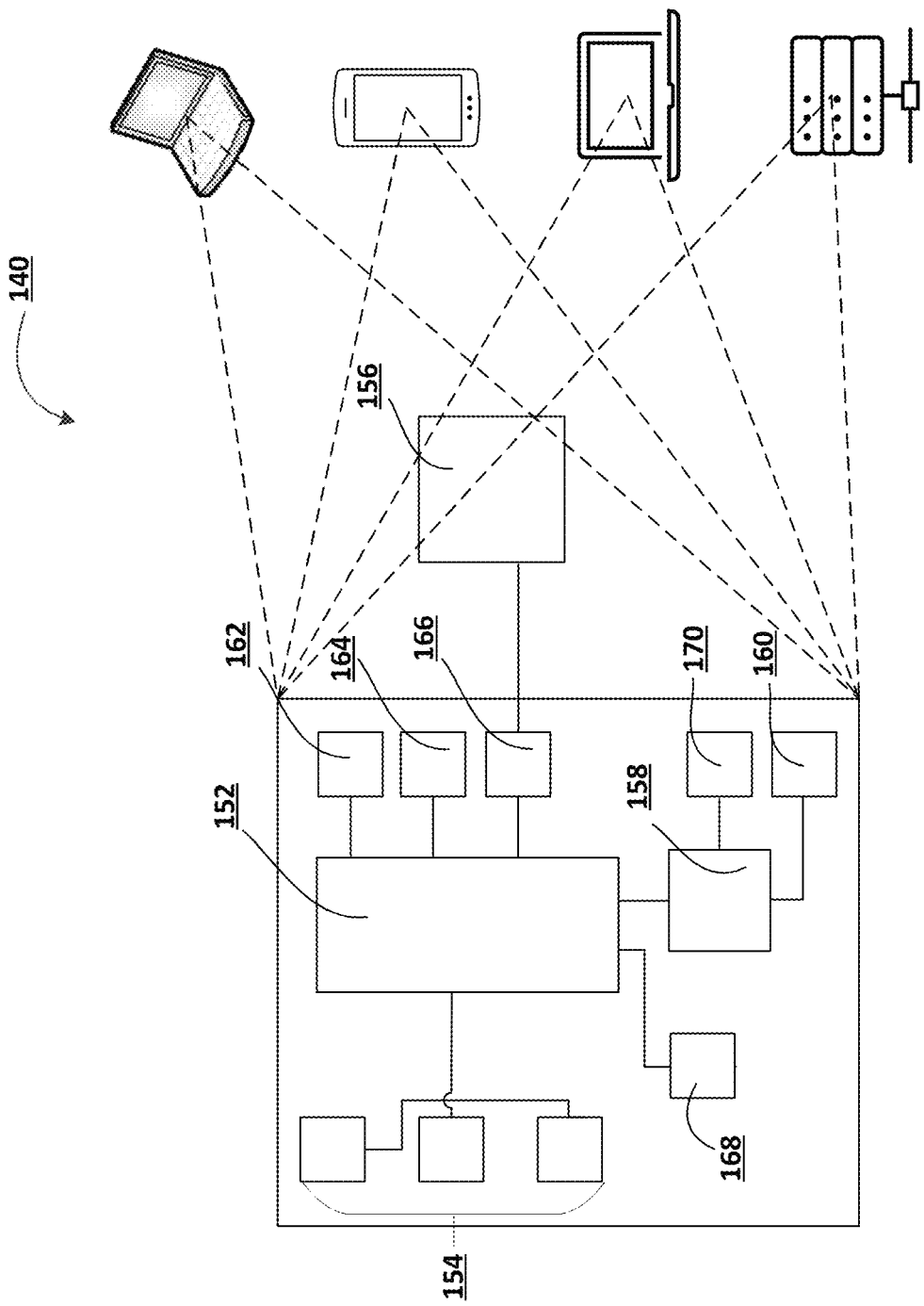

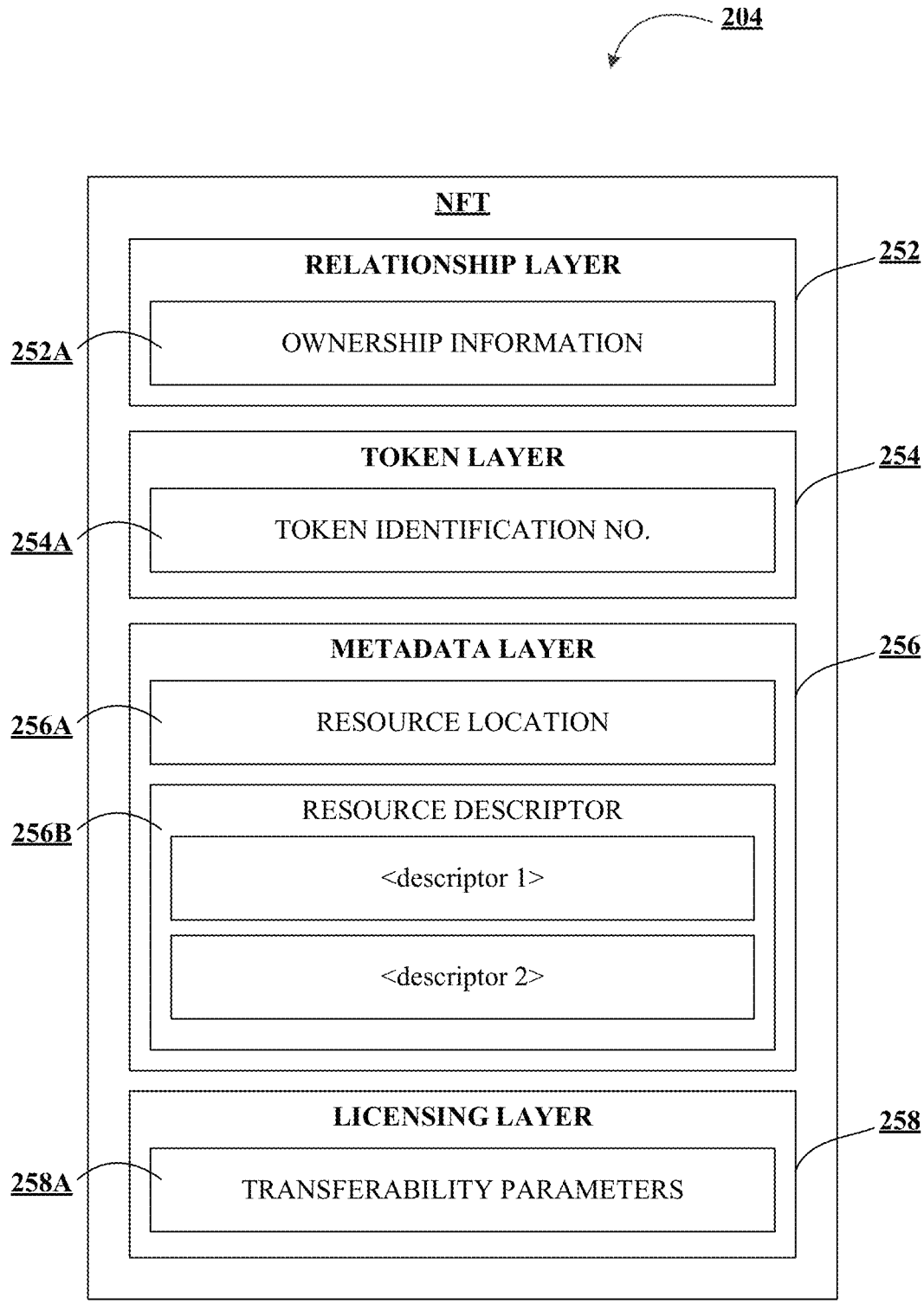
FIGURE <<2B>>

SYSTEM FOR SECURE USER IDENTIFICATION USING DIGITAL IMAGE PROCESSING

FIELD OF THE INVENTION

The present invention embraces a system for secure user identification using digital image processing.

BACKGROUND

Unique device identifier is a digital address that is a string of numeric or alphanumeric code used to identify a user or a user input device within a network to send and receive data. As the unique device identifier is a modified representation of a public encryption key, the user may share their identifier with other users within the network allowing them to execute network-based transactions with the user. It is not uncommon to have situations in which a network-based transaction is directed towards an unintended user with similar unique device identifier as the intended user. In architectures where each network-based transaction is recorded in a distributed ledger, such transactions become irreversible once recorded in the distributed ledger.

Therefore, there is a need for a system to secure user identification using digital image processing techniques to reduce the number of instances where a network-based transaction is executed with an unintended user.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for secure user identification using digital image processing is presented. The system comprising: a non-transitory storage device; and a processor coupled to the non-transitory storage device, wherein the processor is configured to: receive, via a first user input device, an input selection of a first image from a first user, wherein the first image is associated with a second user; extract features of the first image; determine a secure image matching the first image based on at least the features of the first image; extract, from the secure image, a unique device identifier associated with the second user embedded thereon; and transmit control signals configured to cause the first user input device to display the unique device identifier.

In some embodiments, the processor is further configured to: receive, from a second user input device, an input loading the secure image; receive, from the second user input device, the unique device identifier; embed the unique device identifier in the secure image; generate, using a non-fungible token (NFT) generator, a first NFT for the secure image with the unique device identifier embedded thereon; record the NFT in a distributed ledger; and generate the first image representing the secure image.

In some embodiments, the processor is further configured to: retrieve the NFT from the distributed ledger in response to receiving the input selection of the first image from the first user; retrieve, from a metadata layer of the NFT, the secure image; and extract, using the feature extraction engine, features of the secure image.

In some embodiments, the processor is further configured to: transform, using a vectorization engine, the features of the first image into a first array of vectors; transform, using the vectorization engine, the features of the secure image into a second array of vectors; map the first array of vectors and the second array of vectors in a high dimensional vector space; determine that a similarity index between the first array of vectors and the second array of vectors satisfies a similarity threshold; and determine that the secure image matches the first image in an instance that the similarity index satisfies the similarity threshold.

In some embodiments, the processor is further configured to: receive, via the first user input device, an indication that the first user wishes to execute a network-based transaction; transmit control signals configured to cause the first user input device to display one or more images associated with one or more users; and receive, via the first user input device, the input selection of the first image indicating that the user wishes to execute the network-based transaction with the second user.

In some embodiments, the processor is further configured to: receive, via the first user input device, a network-based transaction request, wherein the network-based transaction request comprises one or more transaction parameters; and execute the network-based transaction request using the unique device identifier associated with the second user and the one or more transaction parameters.

In some embodiments, the processor is further configured to: receive, via the first user input device, authentication credentials of the first user; determine an authorization level of the first user based on at least the authentication credentials; determine that the authorization level of the user satisfies an authentication requirement associated with the network-based transaction; and execute the network-based transaction request in response to determining that the authorization level of the user satisfies the authentication requirement associated with the network-based transaction.

In some embodiments, the processor is further configured to: prompt the first user to provide the authentication credentials in response to receiving the network-based transaction request.

In another aspect, a computer program product for secure user identification using digital image processing is presented. The computer program product comprising a non-transitory computer-readable medium comprising code causing an apparatus to: receive, via a first user input device, an input selection of a first image from a first user, wherein the first image is associated with a second user; extract features of the first image; determine a secure image matching the first image based on at least the features of the first image; extract, from the secure image, a unique device identifier associated with the second user embedded thereon; and transmit control signals configured to cause the first user input device to display the unique device identifier.

In yet another aspect, a method for secure user identification using digital image processing is presented. The method comprising: receiving, via a first user input device, an input selection of a first image from a first user, wherein the first image is associated with a second user; extracting features of the first image; determining a secure image matching the first image based on at least the features of the first image; extracting, from the secure image, a unique device identifier associated with the second user embedded thereon; and transmitting control signals configured to cause the first user input device to display the unique device identifier.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
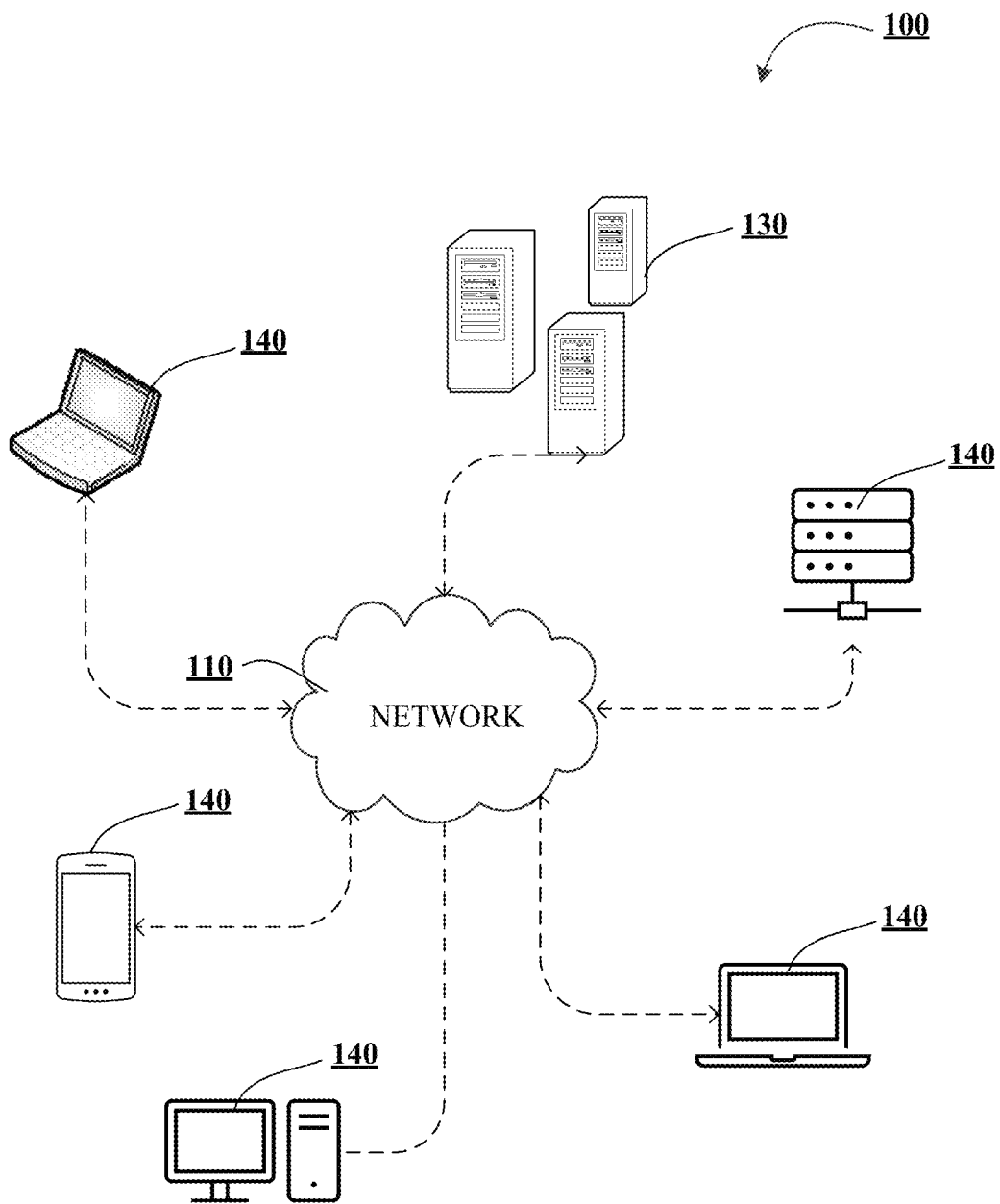
Figure 1B:
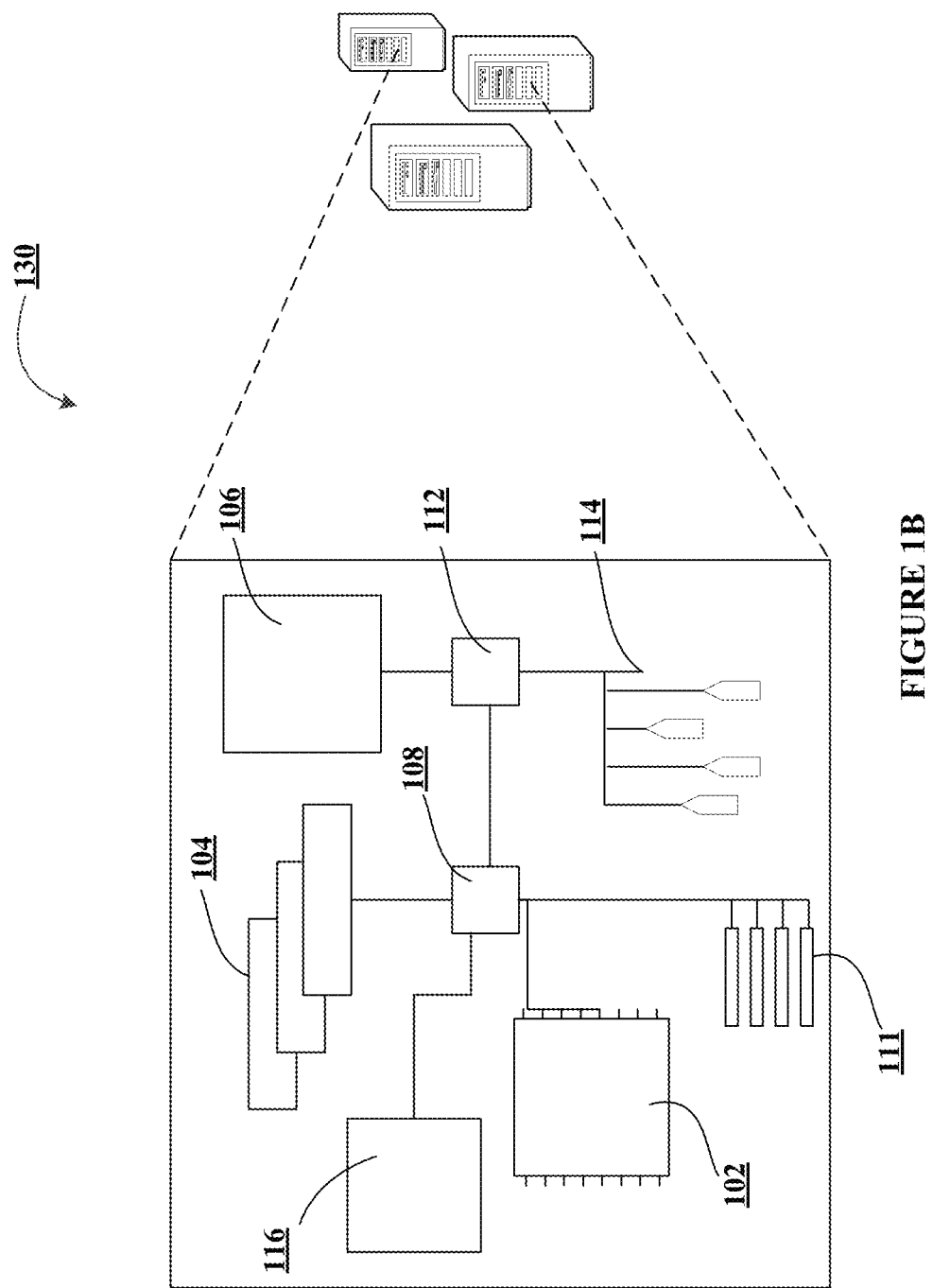
Figure 2A:
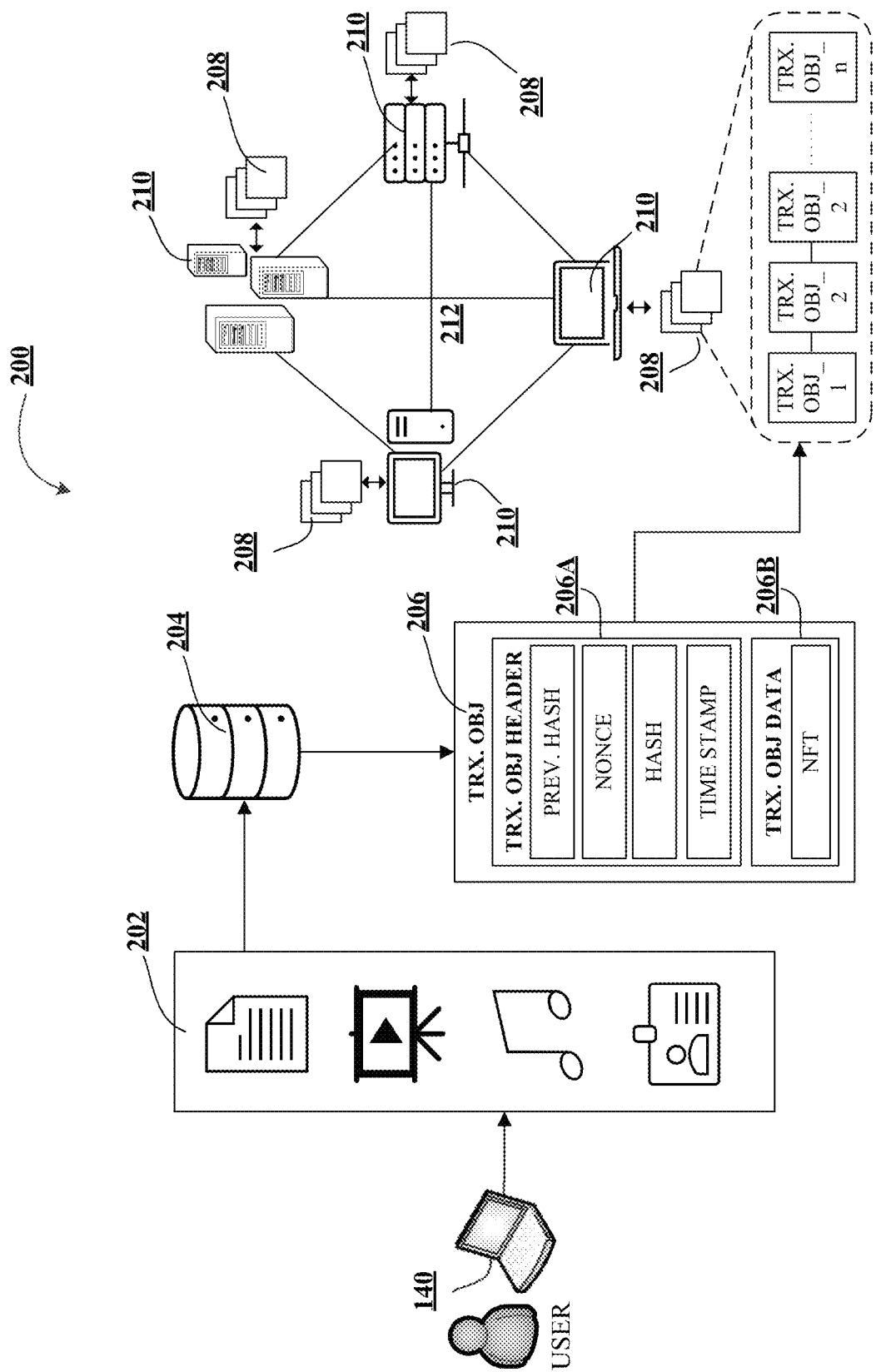
Figure 3:
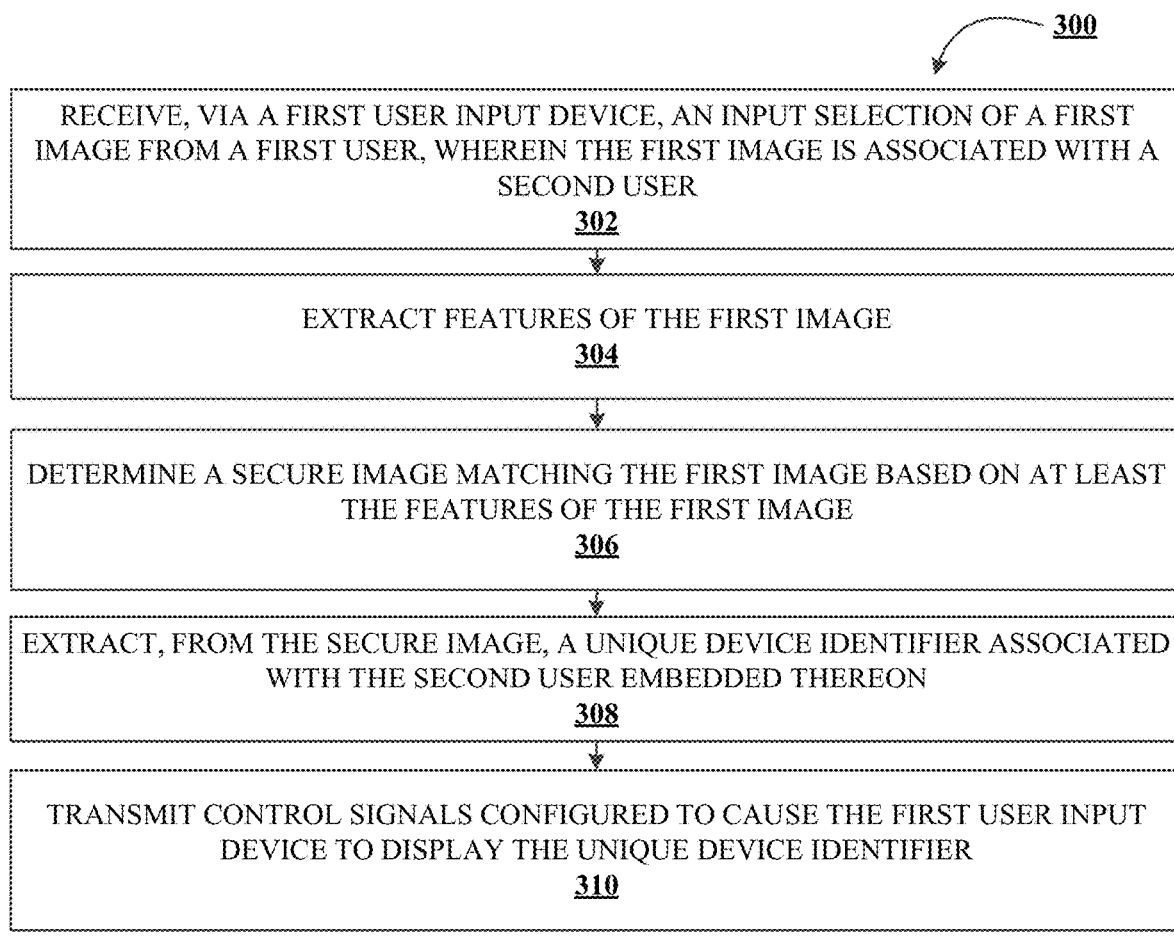
Figure 4:
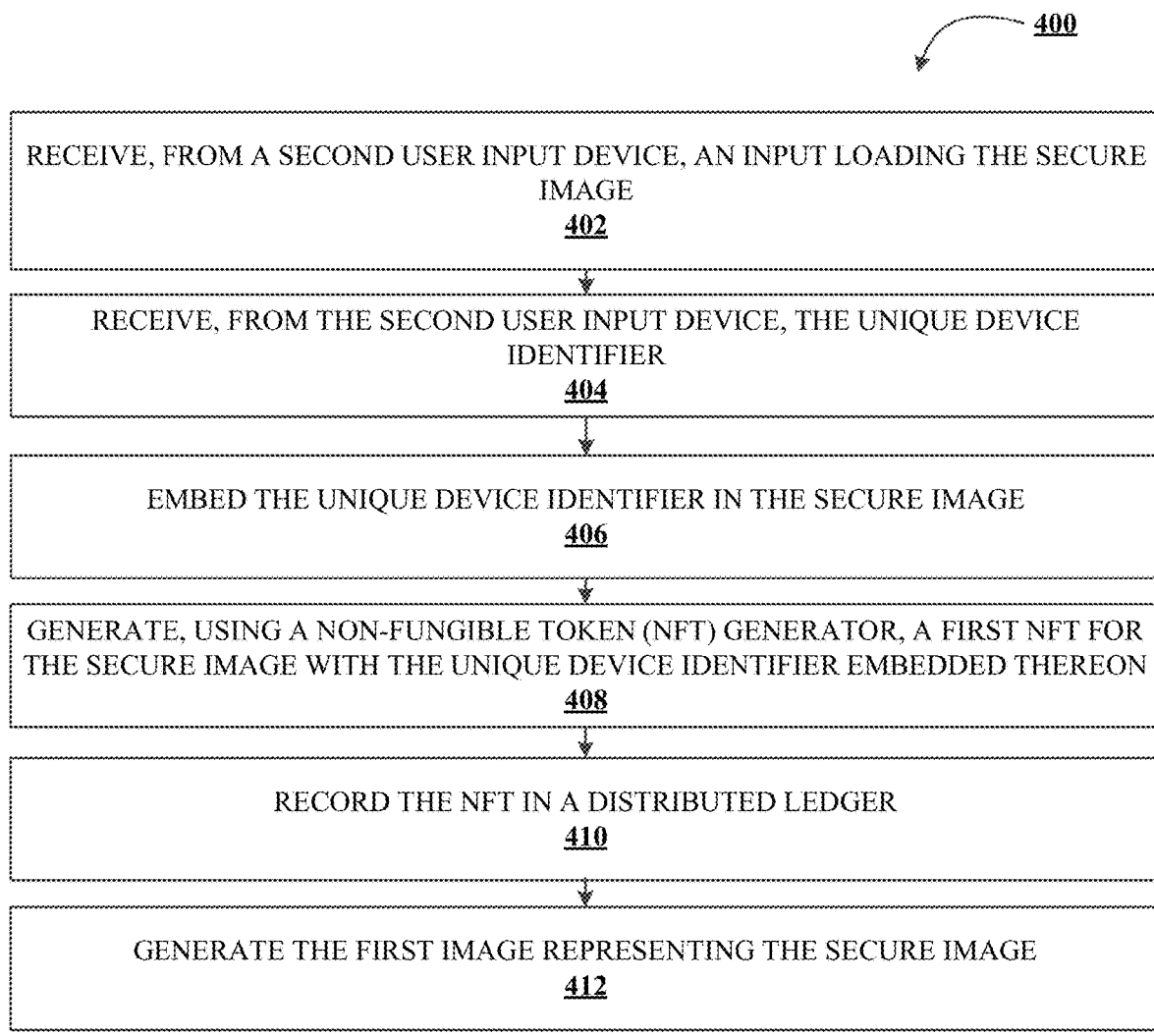

Having thus described embodiments of the invention in general terms, reference will now be made the accompanying drawings, wherein:

FIGS. 1A-1C illustrates technical components of an exemplary distributed computing environment for secure user identification using digital image processing, in accordance with an embodiment of the invention;

FIG. 2A illustrates an exemplary process of creating an NFT 200, in accordance with an embodiment of the invention;

FIG. 2B illustrates an exemplary NFT 204 as a multi-layered documentation of a resource, in accordance with an embodiment of an invention;

FIG. 3 illustrates a process flow for secure user identification using digital image processing, in accordance with an embodiment of the invention; and FIG. 4 illustrates a process flow for generating a secure image, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "image" may refer to any digital artifact that is composed of picture elements, each with finite, discrete quantities of numeric representation for its intensity or gray level that is an output from its two dimensional functions fed as input by its spatial coordinates. In one aspect, an image may have several basic characteristics such as type, resolution, color depth, format, compression, and/or the like.

As used herein, a "feature" may refer to a piece of information about the content of an image; typically, about whether a certain region of the image has certain distinct properties. Features may be specific structures in the image such as points, edges, or objects. Features may also be the result of a general neighborhood operation or feature detection applied to the image. Other examples of features are related to motion in image sequences, or to shapes defined in terms of curves or boundaries between different image regions.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

Unique device identifier is a digital address that is a string of numeric or alphanumeric code used to identify a user or a user input device within a network to send and receive data. It is not uncommon to have situations in which a network-based transaction is directed towards an unintended user with similar unique device identifier as the intended user. In architectures where each network-based transaction is recorded in a distributed ledger, such transactions become irreversible once recorded in the distributed ledger. Therefore, there is a need for a system to secure user identification using digital image processing techniques to reduce the number of instances where a network-based transaction is executed with an unintended user.

Accordingly, the present invention, (i) Receives, via a first user input device, an input selection of an image from a first user. The selected image is associated with a second user with whom the first user wishes to execute a network-based transaction, (ii) Extracts features of the selected image using feature extraction techniques, (iii) Determines a secure image matching the selected image based on at least the features of the first image. The matching process includes: (1) Transforming the features of the selected image into an array of vectors, (2) Representing the array of vectors as a data cluster in a high-dimensional feature space, and (3) Determining a similarity index between the data clusters to identify the secure image that matches the selected image, (iv) Extracts a unique device identifier (destination address) associated with the second user from the secure image. The unique device identifier is embedded on to the secure image by the second user using image processing techniques such as steganography. The secure image with the unique device identifier embedded thereon is stored in an NFT and recorded in a distributed ledger, (v) Determines that the first user is authorized to execute the network-based transaction with the second user using the unique device identifier, and (vi) Executes the network-based transaction using the unique device identifier and any transaction parameters specified by the user.

What is more, the present invention provides a technical solution to a technical problem. As described herein, the technical problem includes the use of image processing techniques to reduce the likelihood of error when identifying target devices within a network when executing network-based transaction. The technical solution presented herein allows for embedding unique device identifiers on to images, whose approximation may then be broadcast to other users within the network as an alternate to the target address. In particular, by reducing the likelihood of error in identifying the right target device, embodiments of the present invention provide a more accurate solution to problem, and thus reduce the number of resources required to remedy any errors made due to a less accurate solution. Furthermore, embodiments of the present invention remove manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for secure user identification using digital image processing 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a process flow for secure user identification using digital image processing 300, in accordance with an embodiment of the invention. As shown in block 302, the process flow includes receiving, via a first user input device, an input selection of a first image from a first user, wherein the first image is associated with a second user. In some embodiments, the system may be configured to receive, via the first user input device, an indication that the first user wishes to execute a network-based transaction. In response, the system may be configured to transmit control signals configured to cause the first user input device to. In response, the system may be configured to receive, via the first user input device, the input selection of the first image indicating that the first user wishes to execute the network-based transaction with the second user.

Next, as shown in block 304, the process flow includes extracting features of the first image. In some embodiments, to extract the features of the first image, feature extraction techniques may be employed. The feature extraction techniques contemplated, described, and/or used herein include traditional feature extraction algorithms such as Harris corner detection, Shi-Tomasi corner detector, scale-invariant feature transform, speeded-up robust features, features from accelerated segment test, binary robust independent elementary features, and/or the like, or deep learning convolutional neural network (CNN) based algorithms such as self-supervised interest point detection and description, D2-Net—trainable CNN for joint description and detection of local features, LF-Net—learning local features from images, image feature matching based on deep learning, deep graphical feature learning for the feature matching problem, and/or the like, or any other suitable feature extraction technique.

Next, as shown in block 306, the process flow includes determining a secure image matching the first image based on at least the features of the first image. In some embodiments, the features extracted from the first image may be used to identify a matching image (e.g., secure image) from a database of images representing other users in the network that have been previously secured and authenticated using NFT techniques. To achieve this, the features extracted from the first image are transformed, using a vectorization engine, into a first array of vectors. Similarly, the features of the secure image are transformed, using the vectorization engine, into a second array of vectors. Representing the images as vectors (numerical) facilitates meaningful analytics to be performed and also creates the instances on which clustering algorithms (and machine learning algorithms) operate. Each property of the multi-dimensional vector representation may be used in comparison analysis.

Next, the system may be configured to initiate clustering algorithms on the first array of vectors and the second array of vectors. In one aspect, clustering algorithms may be configured to group the array of vectors in such a way that array of vectors in the same group (called a cluster) are more similar (in some sense) to each other than to those in other groups (clusters). Clustering algorithms may differ significantly in their understanding of what constitutes a cluster and how to efficiently find them. For example, a cluster may include groups of vectors with small distances between cluster members, dense areas of the data space, intervals, or particular statistical distributions, and/or the like. Clustering can therefore be formulated as a multi-objective optimization problem. The appropriate clustering algorithm and parameter settings (including parameters such as the distance function to use, a density threshold or the number of expected clusters) depend on the individual data set and intended use of the results.

In some embodiments, the system may be configured to identify the clustering algorithm based on at least a cluster model. Examples of clustering model include, but are not limited to, connectivity-based clustering, centroid-based clustering, distribution-based clustering, density-based clustering, grid-based clustering, and/or the like. Each clustering model may be associated with one or more model-specific clustering algorithms. For example, connectivity-based clustering algorithms include hierarchical clustering analysis (HCA), single-linkage clustering, complete linkage clustering, unweighted or weighted pair group method with arithmetic mean, agglomerative clustering, divisive clustering, and/or the like; centroid-based clustering algorithms include k-means clustering and its variants; distribution-based clustering algorithms include Gaussian mixture model clustering, expectation-maximization algorithm, and/or the like; density-based clustering algorithms include density-based spatial clustering of applications with noise (DBSCAN), ordering points to identify the clustering structure (OPTICS), and/or the like; grid-based clustering algorithms include STatistical Information Grid (STING), subspace clustering, and/or the like. Each processing portion of the system 100 can additionally or alternatively leverage: a probabilistic module, heuristic module, deterministic module, or any other suitable module leveraging any other suitable computation method, clustering method, machine learning method, statistical analysis method, or combination thereof. Any suitable machine learning approach can otherwise be incorporated in the system 100. Further, any suitable model (e.g., machine learning, non-machine learning, clustering, non-clustering, etc.) can be used in generating data relevant to the system 130.

Next, the first data cluster representing the first array of vectors and the second array of vectors represented in the high-dimensional feature space. Then, the system may be configured to determine a similarity index between the first data cluster and the second data cluster. In some embodiments, the system may be configured to determine the similarity index between the first data cluster and the second data cluster based on at least determining a distance therebetween. In one aspect, the distance may be based on one or more distance measures, such as, Euclidean distance, Manhattan distance, Pearson Correlation distance, cosine distance, Spearman correlation distance, and/or the like. In response, the system may be configured to determine that the similarity index between the first data cluster and the second data cluster satisfies a similarity threshold, and thus determine that the secure image matches the first image.

Next, as shown in block 308, the process flow includes extracting, from the secure image, a unique device identifier associated with the second user embedded thereon. In some embodiments, the unique device identifier may be embedded on to the secure image using image processing techniques such as steganography. Steganography is the technique of hiding a string (e.g., unique device identifier) within an ordinary, non-secret, image to avoid detection. The string can then be extracted when certain conditions (e.g., matching) are satisfied. The unique device identifier may be a digital address that is a string of numeric or alphanumeric code used to identify the second user or the second user input device within the network. The unique device identifier may be a modified representation of a public encryption key that allows the user to not only identify the second user within the network, but also allows the first user to execute network-based transactions with the second user.

Next, as shown in block 310, the process flow includes transmitting control signals configured to cause the first user input device to display the unique device identifier. In some embodiments, in response to displaying the unique device identifier, the system may be configured to receive, via the first user input device, a network-based transaction request. As part of the network-based transaction request, the system may be configured to receive one or more transaction parameters. In response to receiving the network-based transaction request, the system may be configured to trigger an authentication protocol requiring the first user to authenticate themselves. As part of the authentication protocol, the system may be configured to prompt the first user to input authentication credentials. In response, the system may be configured to receive, via the first user input device, authentication credentials of the first user. Based on the authentication credentials, the system may be configured to determine an authorization level of the first user. In some embodiments, each network-based transaction request may be associated with an authentication requirement. If the authentication level of the user satisfies the authentication requirement, the system may be configured to authorize the first user to execute the network-based transaction request with the second user using unique device identifier in accordance with one or more transaction parameters.

FIG. 4 illustrates a process flow for generating a secure image 400, in accordance with an embodiment of the invention. As shown in block 402, the process flow includes receiving, from a second user input device, an input loading the secure image. In some embodiments, the secure image may be any image that can be used by other users (e.g., first user) to recognize the second user within the network and execute network-based transactions therewith.

Next, as shown in block 404, the process flow includes receiving, from the second user input device, the unique device identifier. As described herein, the unique device identifier may be string of numeric or alphanumeric code representing a digital address that is used to identify the second user or the second user input device within the network.

Next, as shown in block 406, the process flow includes embedding the unique device identifier in the secure image. As described herein, the unique device identifier may be embedded on to the secure image using image processing techniques such as steganography. It is to be understood that any applicable image processing or equivalent techniques may be used to achieve a similar result.

Next, as shown in block 408, the process flow includes generating, using a non-fungible token (NFT) generator, a first NFT for the secure image with the unique device identifier embedded thereon. In some embodiments, the system may be configured to store, in the metadata layer of the first NFT, the secure image, features extracted from the secure image, an array of vectors representing the features, and/or the like, as resource descriptors.

Next, as shown in block 410, the process flow includes recording the NFT in a distributed ledger.

Next, as shown in block 412, the process flow includes generating the first image representing the secure image. In some embodiments, the first image may be identical to the secure image. In one aspect, the first image may be an approximation of the secure image.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure user identification using digital image processing, the system comprising:
   a processor;
   a non-transitory storage device containing instructions that, when executed by the processor, cause the processor to:
   receive, via a first user input device, an input selection of a first image from a first user, wherein the first image is associated with a second user;
   extract features of the first image;
   determine a secure image matching the first image based on at least the features of the first image;
   extract, from the secure image, a unique device identifier associated with the second user embedded thereon;
   transmit control signals configured to cause the first user input device to display the unique device identifier;

receive, via the first user input device, a network-based transaction request, wherein the network-based transaction request comprises one or more transaction parameters; and execute the network-based transaction request using the unique device identifier associated with the second user and the one or more transaction parameters.

2. The system of claim 1, the instructions, when executed, further causes the processor to:

receive, from a second user input device, an input loading the secure image;

receive, from the second user input device, the unique device identifier;

embed the unique device identifier in the secure image;

generate, using a non-fungible token (NFT) generator, a first NFT for the secure image with the unique device identifier embedded thereon;

record the NFT in a distributed ledger; and generate the first image representing the secure image.

3. The system of claim 2, the instructions, when executed, further causes the processor to:

retrieve the NFT from the distributed ledger in response to receiving the input selection of the first image from the first user;

retrieve, from a metadata layer of the NFT, the secure image; and extract, using a feature extraction engine, features of the secure image.

4. The system of claim 3, the instructions, when executed, further causes the processor to:

transform, using a vectorization engine, the features of the first image into a first array of vectors;

transform, using the vectorization engine, the features of the secure image into a second array of vectors;

determine that a similarity index between the first array of vectors and the second array of vectors satisfies a similarity threshold; and determine that the secure image matches the first image in an instance that the similarity index satisfies the similarity threshold.

5. The system of claim 1, the instructions, when executed, further causes the processor to:

receive, via the first user input device, an indication that the first user wishes to execute a network-based transaction;

transmit control signals configured to cause the first user input device to display one or more images associated with one or more users; and receive, via the first user input device, the input selection of the first image indicating that the user wishes to execute the network-based transaction with the second user.

6. The system of claim 1, the instructions, when executed, is further causes the processor to:

receive, via the first user input device, authentication credentials of the first user;

determine an authorization level of the first user based on at least the authentication credentials;

determine that the authorization level of the user satisfies an authentication requirement associated with the network-based transaction; and execute the network-based transaction request in response to determining that the authorization level of the user satisfies the authentication requirement associated with the network-based transaction.

7. The system of claim 6, the instructions, when executed, further causes the processor to:

prompt the first user to provide the authentication credentials in response to receiving the network-based transaction request.

8. A computer program product for secure user identification using digital image processing, the computer program product comprising a non-transitory computer-readable medium comprising code causing an apparatus to:

receive, via a first user input device, an input selection of a first image from a first user, wherein the first image is associated with a second user;

extract features of the first image;

determine a secure image matching the first image based on at least the features of the first image;

extract, from the secure image, a unique device identifier associated with the second user embedded thereon;

transmit control signals configured to cause the first user input device to display the unique device identifier;

receive, via the first user input device, a network-based transaction request, wherein the network-based transaction request comprises one or more transaction parameters; and execute the network-based transaction request using the unique device identifier associated with the second user and the one or more transaction parameters.

9. The computer program product of claim 8, wherein the code further causes the apparatus to:

receive, from a second user input device, an input loading the secure image;

receive, from the second user input device, the unique device identifier;

embed the unique device identifier in the secure image;

generate, using a non-fungible token (NFT) generator, a first NFT for the secure image with the unique device identifier embedded thereon;

record the NFT in a distributed ledger; and generate the first image representing the secure image.

10. The computer program product of claim 9, wherein the code further causes the apparatus to:

retrieve the NFT from the distributed ledger in response to receiving the input selection of the first image from the first user;

retrieve, from a metadata layer of the NFT, the secure image; and extract, using a feature extraction engine, features of the secure image.

11. The computer program product of claim 10, wherein the code further causes the apparatus to:

transform, using a vectorization engine, the features of the first image into a first array of vectors;

transform, using the vectorization engine, the features of the secure image into a second array of vector;

determine that a similarity index between the first array of vectors and the second array of vectors satisfies a similarity threshold; and determine that the secure image matches the first image in an instance that the similarity index satisfies the similarity threshold.

12. The computer program product of claim 8, wherein the code further causes the apparatus to:

receive, via the first user input device, an indication that the first user wishes to execute a network-based transaction;

transmit control signals configured to cause the first user input device to display one or more images associated with one or more users; and receive, via the first user input device, the input selection of the first image indicating that the user wishes to execute the network-based transaction with the second user.

13. The computer program product of claim 8, wherein the code further causes the apparatus to:

receive, via the first user input device, authentication credentials of the first user;

determine an authorization level of the first user based on at least the authentication credentials;

determine that the authorization level of the user satisfies an authentication requirement associated with the network-based transaction; and execute the network-based transaction request in response to determining that the authorization level of the user satisfies the authentication requirement associated with the network-based transaction.

14. The computer program product of claim 13, wherein the code further causes the apparatus to:

prompt the first user to provide the authentication credentials in response to receiving the network-based transaction request.

15. A method for secure user identification using digital image processing, the method comprising:

receiving, via a first user input device, an input selection of a first image from a first user, wherein the first image is associated with a second user;

extracting features of the first image;

determining a secure image matching the first image based on at least the features of the first image;

extracting, from the secure image, a unique device identifier associated with the second user embedded thereon;

transmitting control signals configured to cause the first user input device to display the unique device identifier;

receiving, via the first user input device, a network-based transaction request, wherein the network-based transaction request comprises one or more transaction parameters; and executing the network-based transaction request using the unique device identifier associated with the second user and the one or more transaction parameters.

16. The method of claim 15, wherein the method further comprises:

receiving, from a second user input device, an input loading the secure image;

receiving, from the second user input device, the unique device identifier;

embedding the unique device identifier in the secure image;

generating, using a non-fungible token (NFT) generator, a first NFT for the secure image with the unique device identifier embedded thereon;

recording the NFT in a distributed ledger; and generating the first image representing the secure image.

17. The method of claim 16, wherein the method further comprises:

retrieving the NFT from the distributed ledger in response to receiving the input selection of the first image from the first user;

retrieving, from a metadata layer of the NFT, the secure image; and extracting, using a feature extraction engine, features of the secure image.

18. The method of claim 17, wherein the method further comprises:

transforming, using a vectorization engine, the features of the first image into a first array of vectors;

transforming, using the vectorization engine, the features of the secure image into a second array of vectors;

determining that a similarity index between the first array of vectors and the second array of vectors satisfies a similarity threshold; and determining that the secure image matches the first image in an instance that the similarity index satisfies the similarity threshold.

19. The method of claim 15, wherein the method further comprises:

receiving, via the first user input device, an indication that the first user wishes to execute a network-based transaction;

transmitting control signals configured to cause the first user input device to display one or more images associated with one or more users; and receiving, via the first user input device, the input selection of the first image indicating that the user wishes to execute the network-based transaction with the second user.

20. The method of claim 15, wherein the method further comprises:

receiving, via the first user input device, authentication credentials of the first user;

determining an authorization level of the first user based on at least the authentication credentials;

determining that the authorization level of the user satisfies an authentication requirement associated with the network-based transaction; and executing the network-based transaction request in response to determining that the authorization level of the user satisfies the authentication requirement associated with the network-based transaction.

* * * * *